United States Patent [19]
Loe

[11] 3,731,670
[45] May 8, 1973

[54] CORPOREAL FLUID CONTROL USING BISTABLE MAGNETIC DUCT VALVE

[75] Inventor: James M. Loe, Willow Grove, Pa.

[73] Assignee: David Roy Pressman, Philadelphia, Pa. ; a part interest

[22] Filed: May 3, 1971

[21] Appl. No.: 139,711

[52] U.S. Cl. ............... 128/1 R, 128/DIG. 25, 251/65
[51] Int. Cl. ............................................. A61b 19/00
[58] Field of Search ................... 128/1 R, 79, 130, 128/127, 349, DIG. 25, 274; 251/65

[56] References Cited

UNITED STATES PATENTS

| 3,495,620 | 2/1970 | Raimondi et al. | 137/529 |
| 2,939,475 | 6/1960 | Roach | 251/65 |
| 3,642,004 | 2/1972 | Osthagen et al. | 128/349 R |
| 3,419,008 | 12/1968 | Plishner | 128/346 |

FOREIGN PATENTS OR APPLICATIONS

| 744,858 | 2/1956 | Great Britain | 251/65 |
| 91,967 | 7/1968 | France | 128/1 R |
| 1,911,649 | 9/1970 | Germany | 251/65 |

Primary Examiner—Dalton L. Truluck
Attorney—David R. Pressman

[57] ABSTRACT

A binary duct valve comprising a tubular housing containing a magnetically sensitive closure member (e.g., a spheroid) small enough to move freely in said housing, and a pair of magnetized valve seats positioned at the respective ends of said housing, one seat having an aperture therethrough which is shaped to become sealed, thereby to occlude said housing when said closure member sits thereon, the other seat being shaped so that it does not occlude said housing, even when said closure member sits thereon. The valve is operated by directing the closure member to a selected seat by means of magnetic force from an external source. The valve may be used advantageously in conjunction with an extracorporeal magnetic source for binary control of fluid flow. Preferably a valve is mounted to both vasa deferentia or fallopian tubes to serve as a contraceptive or selective fertility control device, but it may also be mounted, inter alia, in the urethra for controlling urinary incontinence, in penile veins to selectively induce tumescence, or in any duct or tube in which fluid flow is to be controlled by means essentially entirely without said duct or tube.

24 Claims, 5 Drawing Figures

PATENTED MAY 8 1973

3,731,670

INVENTOR.
JAMES M. LOE

D R Pressman
ATTORNEY

CORPOREAL FLUID CONTROL USING BISTABLE MAGNETIC DUCT VALVE

BACKGROUND OF THE INVENTION

1. Field of the Invention

This invention relates to a binary duct valve and method of using same and particularly it relates to (a) such a valve which may be used advantageously within a duct of an animal's body to control the flow of fluids therein and (b) a method of controlling such fluids by implanting said valve in said duct and using extracorporeal means to operate said valve.

2. Description of the Prior Art

Prior duct valves have been difficult to operate remotely. Those valves which were designed to be operated remotely, such as some magnetically operated valves, generally were complex, expensive, unreliable, or of such a design which effectively precluded miniaturization or complete duct implantation. Therefore one object of this invention is to provide a duct valve which overcomes these drawbacks.

A duct valve which overcomes the foregoing drawbacks can be used, also according to the invention, to provide advantageous means of controlling bodily fluids by extracorporeal means. Such means are desirable, as will be recognized by the medical profession.

For example, in the field of contraception, a number of means are available, but each has one or more serious drawbacks. Contraceptive pills and intrauterine contraceptive devices have numerous contraindications and side effects. Mechanical shields (condom, diaphragm) are awkward, decrease sensation, and are unreliable. Similarly, other chemical agents are awkward and unreliable. Vasectomy has some of the aforementioned drawbacks, and is difficult and expensive to reverse.

Recently, Lee has proposed (13 J. Korean Med. Assn. 904 (1970)) the surgical implantation of removable barriers in vasa deferentia for interrupting fertility by blocking spermatic fluid until the barriers are removed. Although such barriers appear to be a step forward, restoration of fertility necessitates their removal by surgery. Furthermore, restoration of fertility often is not possible if the barrier has been in the vasal lumen for a year or more since long term blockage of a vas deferens may allow pressure to accumulate, rupturing the epididymal tubules. Therefore another object of the invention is to provide, using the valve of the invention, means for selectively interrupting fertility without the above drawbacks.

The present invention overcomes the drawbacks of the intravasal barrier by enabling extracorporeal control of spermatic fluid flow, thus eliminating the requirement for surgery to re-establish fertility. The present invention also allows the periodic re-establishment of spermatic fluid flow on a schedule sufficient to prevent damage to the epididymal tubules, thus obviating the possibility of permanent sterility caused by rupture of said tubules.

Previous means for controlling other ducted secretions or fluids in the bodies of animals also have had drawbacks, such as the requirement of permanent surgical alteration, or other less-than-satisfactory means. Therefore a further object is to provide improved means for controlling other intracorporeal secretions and fluids.

An exemplary case of a ducted fluid for which improved control means would be desirable is illustrated by the problem of urinary incontinence. Previous means for controlling urinary incontinence have had major drawbacks, such as the requirement of awkward and bulky means, e.g., urine receptacles, the requirement of periodic catheterization, etc. Therefore yet another object is to provide improved means of controlling urinary incontinence.

Another exemplary case is male tumescence. Previous means for controlling male tumescence generally have been awkward and unreliable. Therefore a further object of this invention is to provide improved means for controlling male tumescence.

Other ducted body secretions for which effective control means would often be desirable are those of the lymphatic and hormonal systems. Therefore a still further object is to provide effective means for controlling these secretions.

Aside from bodily secretions, another advantageous use of the present duct valve is general control of fluid flow in noncorporeal ducts, e.g., in laboratory equipment, chemical plants, etc. The ease and perfection by which remote control of the present valve may be obtained makes it especially useful in systems where perfect isolation must be maintained, e.g., in nuclear, ultra-pure, or biological systems. Therefore a yet further object is the control of fluid flow in noncorporeal systems.

Additional objects and advantages of the present invention will become apparent from the ensuing description thereof.

DRAWINGS

FIG. 1 is a sectional view of the valve of the invention installed in an animal duct, together with an actuating magnet and including a sectional showing of the valve seats of FIGS. 2 and 3 taken along lines 1—1 and 1—1, respectively.

DESCRIPTION OF THE PREFERRED EMBODIMENTS

Figures 1, 2, 3, 4, 5:
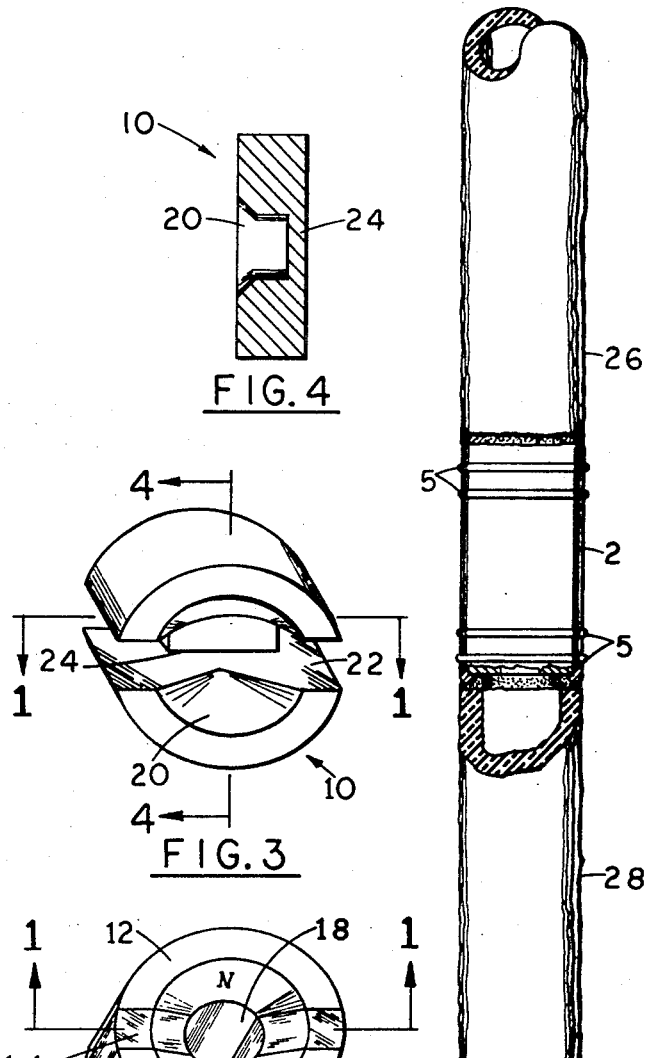
FIGS. 2 and 3 are perspective views of the occluding and non-occluding seats, respectively, of said valve.
FIG. 4 is a sectional view of the seat of FIG. 3, taken along the line 4—4.
FIG. 5 is a partial sectional view of said valve, together with optional extension tubes attached to the respective ends of said valve.

FIG. 1 shows a preferred form of a valve according to the invention installed in a duct 3, which, as explained infra, may be any of several ducts in an animal's body, or which may be any magnetically transmissive duct which carries any fluid, including gases. The valve comprises a cylindrical housing 4 having integral, circumferential sealing rings 5, a spherical closure member 6, and valve seats 8 and 10, mounted in the respective ends of housing 4. The orientation of valve 2 in duct 3 can be in either direction with respect to the normal direction of fluid flow in duct 3. Seat 8, is occludable, i.e., when closure member sits thereon as indicated, no fluid can flow through seat 8; hence housing 4 and the entire valve is closed. Seat 10 is non-occludable, i.e., when closure member 6 sits thereon, as indicated by the broken line at 6', fluid may pass freely around member 6 and through seat 8 so that housing 4, valve 2, and duct 3 are open.

An actuating magnet 34 is provided with the valve for operating the valve by manual operation of the magnet from outside duct 3, as explained infra.

FIG. 2 is an enlarged perspective view of occluding seat 8. Seat 8 comprises a cylindrical body having a permanent magnet portion 12 and a two-part nonmagnetic insert or divider 14 which extends approximately two-thirds of the cylinder's height, as indicated in FIG. 1. Magnetic portion 12 is permanently magnetized so that the north magnetic pole lies on one side of divider 14 and the south magnetic pole on the opposite side of divider 14. A conical recess 16 is provided at one end of seat 8; a central bore or through hole 18 in seat 8 communicates with recess 16. Recess 16 preferably has straight sides but also can have concave sides which match the curvature of closure member 6. As shown in FIG. 1, the dimensioning of recess 16 is such that a full circle line of contact is provided between the surface of recess 16 and the surface of closure member 6.

Closure member 6 is constructed of magnetically sensitive material which is attracted to the magnetic portion of the seat 8. Upon contacting seat 8, closure member 6 will be seated symmetrically in recess 16, where it connects the north and south poles to provide a closed magnetic flux path, thereby greatly enhancing the magnetic attractive force between seat 8 and closure member 6. This provides a strong holding force between seat 8 and closure member 6, resulting in a highly vibration resistant and fluid tight seal.

Non-occludable seat 10 (FIGS. 3 & 4) comprises a one piece permanent magnet having a conical recess 20 similar to that of recess 16 of seat 8. Seat 10 contains a slot 22 which bisects seat 10, save for a small joinder portion 24 of rectangular (or, optionally, other) cross section adjacent one end of seat 10. Slot 22 is slightly narrower than the diameter of closure member 6. Joinder portion 24 is dimensioned so that the closure member 6 will be spaced therefrom when closure member 6 is seated on seat 10, as shown at 6' in FIG. 1.

While certain specific features of the invention have been shown and discussed in the above preferred embodiment, various omissions, substitutions, and changes in the form and details of the device illustrated and in their operation may be made within the scope of the invention.

For example, when the device is to be implanted in an animal duct, it may be desirable to attach extension tubes 26 and 28 to the respective ends of the valve as shown in FIG. 5. Tubes 26 and 28 are attached, preferably by means of adhesive to the ends of valve 2, in order to improve (1) the fluid seal between the valve assembly and animal duct, and (2) the positional stability of the valve within said duct.

A valve which can be opened or closed only temporarily can be provided by fabricating one seat of nonmagnetic material. For example, if the valve is to be openable temporarily, occludable seat 8 would be made of nonmagnetic material.

Detail changes may be made in the magnetic seats, e.g., the seats may be provided with four poles (two north and two south) by suitably magnetizing said seats and providing additional nonmagnetic dividers if required. In addition, seats 8 and 10 may be provided with tapered annular extensions, protruding into said housing, such that the right angle corners formed by said seats and the inner surface of said housing are eliminated, thus prohibiting fluid stagnation in said corners. Also, closure member 6 may be permanently magnetized in lieu of or in addition to magnetizing seats 8 and 10.

Moreover, the permanent magnet seats 8 and 10 may be replaced by electromagnet seats, that is, seats in which the magnetic force is produced by the flow of electric current. For example, a flux coil could be provided around each end of the valve and the seats would be made of soft iron. In addition, magnet 34 could be replaced by a solenoid encircling valve 2 and duct 3, such a solenoid being operable from a DC source by a reversing switch.

The valve may be fabricated by forming cylindrical housing 4 of a thermoplastic material, e.g., nylon or polycarbonate, into which seats 8 and 10 can be press-fit or "snap-fit." Closure member 6 may be of soft iron, seat 10 and magnetic portion of seat 8 of alnico V or a ceramic magnet material, and insert 14 of seat 8 of a thermoplastic or thermoset material or of a nonmagnetic metal. All parts should be formed of noncorrosive materials or may be clad with noncorrosive materials. If valve 2 is to be installed in an animal's body, the surfaces of all parts should be body compatible. Both seats 8 and 10 have configurations which lend themselves to fabrication by common metal shaping techniques or by sintering. Insert 14 may be press fit or cast in place using epoxy. If the valve of FIG. 5 is to be installed in an animal's body, extensions 26 and 28 may be fabricated of silicone rubber tubing which is cemented to the ends of valve 2 by means of silicone rubber adhesive, or other body-compatible material.

OPERATION OF THE PREFERRED EMBODIMENT

When closure member 6 is magnetically held to seat 8 as indicated in FIG. 1, the bore of seat 8 is completely occluded and therefore the valve is closed. Thus no fluid can flow through duct 3.

Valve 2 may be opened by moving closure member 6 from seat 8 to seat 10. This is accomplished by bringing the actuating magnet 34 into proximity with seat 8 in the position indicated such that the magnetic field from magnet 34 can embrace closure member 6, and then moving magnet 34, adjacent the valve, to a position in proximity with seat 10. When closure member 6 is seated on seat 10, as indicated at 6', magnet 34 may be withdrawn from the vicinity of the valve and closure member 6 will be held in position by the magnetic flux of seat 10.

When closure member 6 is in position at seat 10 as indicated at 6', the valve is open because fluid can pass around closure member 6 and through slot 22 (around joinder portion 24) of seat 10. Thus fluid can flow with substantially no impediment through duct 3.

The valve will remain in open status until the actuating process is reversed. This is accomplished by passing actuating magnet 34 from a position adjacent seat 10 to a position adjacent seat 8. As before, closure member 6 will detach from the initial seat, follow actuating magnet 34 to the final seat, and be held there by the magnetic flux of the final seat.

Various modifications in the details of the method of actuating the valve may be made by those skilled in the art. For example, an actuating magnet may be shaped and placed so that it temporarily neutralizes the magnetic flux of the seat to which the closure member is initially held, allowing the magnetic flux of the unoccupied seat to draw said closure member to said previously unoccupied seat. Upon withdrawal of said actuating magnet, said closure member will be held by the magnetic flux of the previously unoccupied seat until the actuating process is reversed.

Also an electromagnet can be substituted for the permanent magnet actuating magnet. Such electromagnet can be a solenoid encircling duct 3 as discussed, or can be a direct replacement for magnet 34. Further valve 2 can be provided with electromagnetic coils, in addition to the permanently magnetized valve members, said coils creating sufficient flux to transfer closure member 6 from seat to seat in response to application of electrical current to said coils.

The valve of the invention is effective to control fluid flow within any type of duct in which it is installed, but since its configuration lends itself to easy miniaturization and since it can be controlled remotely by means of magnetic flux, one of its more advantageous uses appears to be in the lumen of a duct of an animal's body for controlling fluid flow within said duct. However the valve can be used advantageously in any duct whatever where fluid flow control is desired, e.g., in chemical process systems, intake and effluent control, laboratory equipment, etc. Of course the duct should preferably be substantially transmissive of magnetic force, but even ferrous or other partially transmissive ducts can be utilized, at some loss in magnetic efficiency.

Valve 2 can be implanted within an animal duct by the following method: First a surgical incision is made through the external and internal tissue between said duct and a convenient adjacent external body surface to expose said duct. Next, said duct is incised longitudinally at a location adjacent the desired location for the valve, the valve is inserted in the lumen of the duct and pushed through the lumen to the desired position. Last, said incisions are closed by standard surgical methods. Alternatively, after the duct is surgically exposed, and if the duct is small and flexible (e.g., if it is a vas deferens), valve implantation can be accomplished by making a needle puncture in the duct and threading or pushing the valve through such puncture according to the techniques described by Lee, op. cit.

Various animal duct adaptations of the invention are illustrated by the following examples:

Example 1 — Contraception

When used to provide contraception by selective male fertility control, valve 2 is surgically implanted in both of the vasa deferentia through a scrotal incision. (The valve can be implanted in only one vas if the remaining vas is resected as in ordinary vasectomy.) The valve is implanted so that occludable seat 8 is the distal end with respect to the testicle. Thus seminal fluid pressure, generated in the testes, will act to improve the seal of closure member 6 when it sits on the occludable seat 8.

If the tubular extensions 26 and 28 of FIG. 5 are used with valve 2, each should be about 0.4 inch in length. These extensions improve the fluid seal between the outer periphery of the valve and the inner surface of the vas, and also retain the valve more stably in the vas.

The size of valve 2 is determined by the inner diameter of the vas in which it is installed. For the adult human male this size is typically about 0.045 inch in diameter. The length of said valve is about 0.070 inch.

As previously noted, long term blockage of a vas deferens can lead to permanent sterility due to damage to the epididymal tubules from buildup of spermatic fluid pressure. Since the valve of this invention can be opened temporarily (e.g., at six month intervals), to provide periodic re-establishment of continuity of the vas deferens to release this pressure, it is extremely advantageous in that it can be used to effect long term blockage of the vasa deferentia without imparting permanent sterility.

Example 2 — Urinary Incontinence

The valve may also be advantageously used to provide control of urine flow in cases of urinary incontinence. In such an application, a valve, as described, and suitably sized, is surgically implanted in the urethra. If implanted near the bladder, a relatively strong permanent or electromagnet must be used to actuate the valve to open the urethra since the valve would be relatively deeply implanted in the body. Alternatively, the valve can be actuated by temporary insertion of a suitable smaller magnet into the rectum in the male, or into the vagina in the female, so as to bring the magnet close enough to the valve to move the closure member 6. A valve of the temporarily openable type as aforementioned would be useful in this application. In this application the valve would be installed so that occludable seat 8 is proximal to the bladder and the magnetic seating force controlled so that should the pressure in the bladder approach the maximum safe pressure, the valve would open temporarily to reduce pressure in the bladder.

Example 3 — Other Ducts

Valve 2 may be used to advantage to control the flow of other ducted body fluids, such as those of the lymphatic or hormonal system. In such a use, a valve as described, and suitably sized, is implanted by means of surgery in the selected duct. Extracorporeal control of fluid flow in the selected duct is then exercised by the means previously described.

In a similar manner, a valve, as described, and suitably sized, may be implanted in both fallopian tubes in an animal's body, thereby to provide control of female fertility.

Example 4 — Tumescence

Valve 2 may be advantageously used to produce tumescence of the penis, where such ability has been lost. In this application, valve 2 is implanted in one or both of the dorsal veins draining the erectile tissue of the penis. A relief opening should be provided through occludable seat 8, especially if the valve is implanted in both veins, so as not to effect complete blockage of the penile effluent when the valve is in the closed condition. Closure of said valve or valves by suitable magnetic extracorporeal means, as described, will partially block venous blood flow from the penis, increasing blood pressure in said erectile tissues, resulting in tumescence of the penis. Reapplication of suitable actuating means, as described, restores full veinous blood flow, resulting in detumescence.

While the above description contains many specificities, these should not be construed as limitations upon the scope of the invention but merely as an exemplification of several preferred embodiments thereof. The true scope of the invention is indicated by the subject matter of the appended claims and the legal equivalents thereof.

I claim:

1. A valve for use within a duct of an animal's body, comprising: (a) a tubular housing and (b) the following valve means within said housing: (1) a closure member small enough to move freely in said housing and (2) a pair of valve seats mounted apart in said housing on opposite sides of said closure member, one of said valve seats being shaped to occlude said housing when said closure member sits thereon, the other of said valve seats being shaped so that it does not occlude said housing, even when said closure member sits thereon, both of said valve means being formed of a magnetically sensitive material, the magnetically sensitive material of at least one of said valve means also having magnetic retentive properties, characterized in that the spacing, shape, and size of said valve means are such that when said valve means which has magnetic retentive properties is magnetized, said closure member will remain stably on either of said valve seats in the absence of external influence, whereby said duct valve can be made to assume a stably open or a stably closed condition.

2. The valve of claim 1 further comprising means, external to said housing, for selectively providing magnetic force within said housing to urge said closure member to or from a selected one of said seats.

3. The valve of claim 1 further including a permanent magnet, external to said housing, which can be manually manipulated to urge said closure member to either one of said seats.

4. The valve of claim 1 wherein said closure member is spherical in shape, said one of said seats is annular in shape and has a concave depression therein terminating in a circular opening which becomes substantially completely occluded when said closure member sits thereon, the other of said seats comprising a plurality of slots around which fluid can pass when said closure member sits thereon.

5. The valve of claim 1 wherein said housing has an outer diameter of about 0.045 inch and wherein the surfaces of said housing, said two active means, and said closure member are formed of materials which are substantially stable in the presence of animal body fluids, whereby said valve can be implanted in a vas deferens for selective control of male fertility.

6. The valve of claim 5 wherein said housing contains a plurality of spaced sealing rings on the outer surface thereof, each of said rings comprising an integral protrusion of said housing which extends around the periphery of said housing.

7. The valve of claim 1 further including a pair of elongated flexible members attached to the respective ends of said housing, thereby to provide means for more stably retaining said valve in a duct of an animal's body and providing for an improved fluid tight seal between the outer periphery of said housing and the inner surface of said duct.

8. The valve of claim 1 wherein said closure member has said magnetic retentive properties and is permanently magnetized.

9. The valve of claim 1 wherein said pair of valve seats have said magnetic retentive properties and are permanently magnetized.

10. A method for selectively allowing or preventing the flow of fluid within a duct of an animal's body, comprising the following steps:

a. implanting, in said duct, bistable valve means having two states which are stable in the absence of external influence and respectively prevent or allow the flow of fluid within said duct, said valve means being arranged to change its stable state when a predetermined force, of which said duct is transmissive, is directed thereat, and b. selectively transmitting said predetermined force at said valve means via a wall of said duct in order to change the state of said valve means.

11. The method of claim 10 wherein said predetermined force is selectively provided from a source external to said body.

12. The method of claim 11 wherein said valve means is implanted in a vas deferens, thereby to control male fertility.

13. The method of claim 11 wherein said valve means is implanted in a fallopian tube, thereby to control female fertility.

14. The method of claim 11 wherein said valve means is implanted in a urethra, thereby to control urine flow.

15. The method of claim 11 wherein said valve means is implanted in a penile vein, thereby to control male tumescence.

16. The method of claim 11 wherein said implanting comprises longitudinally incising said duct, inserting in said duct a cylindrically shaped version of said valve means, and closing the resultant incision.

17. The method of claim 10 wherein said implanting comprises puncturing said duct and inserting said valve in said duct via the resulting puncture.

18. The method of claim 10 wherein said predetermined force is a magnetic field of a predetermined orientation and strength and wherein said selectively transmitting comprises directing said magnetic field at said valve means via a wall of said duct.

19. The method of claim 18 wherein said implanting comprises inserting in said duct a valve means which comprises a tubular housing, a magnetically sensitive closure member small enough to move freely in said housing, and a pair of permanently magnetized valve seats spaced apart in said housing on opposite sides of said closure member, one of said seats being shaped to occlude said housing when said closure member sits thereon, and the other of said seats being shaped so that it does not occlude said housing even when said closure member sits thereon.

20. The method of claim 18 wherein said magnetic field is provided by placing a permanent magnet adjacent an outside wall of said duct near one end of said valve means and moving said magnet along said outside wall of said duct toward an opposite end of said valve means.

21. In a valve of the type for use within a duct of an animal's body and comprising a pair of spaced seat means, each emissive of a magnetic field, and a magnetically sensitive closure member positioned between said seat means and capable of moving from either of said seat means to the other, one of said seat means being occluding and the other non-occluding when said closure member sits thereon, the improvement wherein said seat means are arranged such that when said closure member sits on either of said seat means, the magnetic field from the other seat means is insufficient to overcome the magnetic attraction exerted by said one seat means for said closure member, whereby said duct valve has bistability.

22. The duct valve of claim 21 wherein said seat means each comprises a permanent magnet having North and South poles and said closure member comprises a magnetically non-retentive member arranged to complete a magnetic path between said poles when it sits on either of said seats.

23. The duct valve of claim 22 wherein said closure member is spherical and the surface of each of said seat means facing said closure member has a conical depression.

24. The duct valve of claim 23 wherein said occluding seat means has a nonmagnetic insert adjacent the surface thereof facing said closure member and is solid except for an axial hole therethrough of smaller diameter than said closure member and said non-occluding seat means is completely bifurcated by a slot therethrough, except for a joinder portion at the center thereof.

* * * * *